(12) United States Patent  (10) Patent No.: US 7,970,912 B2
Bourne  (45) Date of Patent: *Jun. 28, 2011

(54) METHOD AND COMPUTER SYSTEM FOR MATCHING MOBILE DEVICE USERS FOR BUSINESS AND SOCIAL NETWORKING

(75) Inventor: Julian J. Bourne, Penzberg, MA (US)

(73) Assignee: Floshire Mark KG, LLC, Dover, DE (US)

( * ) Notice: Subject to any disclaimer, the term of this patent is extended or adjusted under 35 U.S.C. 154(b) by 375 days.

This patent is subject to a terminal disclaimer.

(21) Appl. No.: 12/205,990

(22) Filed: Sep. 8, 2008

(65) Prior Publication Data

US 2009/0005040 A1 Jan. 1, 2009

Related U.S. Application Data

(63) Continuation of application No. 11/198,126, filed on Aug. 6, 2005, now Pat. No. 7,424,541, which is a continuation of application No. 10/906,194, filed on Feb. 8, 2005, now Pat. No. 7,310,676.

(60) Provisional application No. 60/543,105, filed on Feb. 9, 2004, provisional application No. 60/582,313, filed on Jun. 23, 2004.

(51) Int. Cl.
*G06F 15/16* (2006.01)
*H04M 3/42* (2006.01)
(52) U.S. Cl. ............ 709/227; 455/414.1; 709/208
(58) Field of Classification Search .......... 709/208, 709/227; 455/414.1
See application file for complete search history.

(56) References Cited

U.S. PATENT DOCUMENTS

| | | | |
|---|---|---|---|
| 5,086,394 | A | 2/1992 | Shapira |
| 5,603,054 | A | 2/1997 | Theimer et al. |
| 5,754,938 | A | 5/1998 | Herz et al. |
| 5,754,939 | A | 5/1998 | Herz et al. |
| 6,052,122 | A | 4/2000 | Sutcliffe et al. |
| 6,272,467 | B1 | 8/2001 | Durand et al. |
| 6,529,136 | B2 | 3/2003 | Cao et al. |
| 6,539,232 | B2 | 3/2003 | Hendrey et al. |
| 6,542,749 | B2 | 4/2003 | Tanaka et al. |
| 6,542,750 | B2 | 4/2003 | Hendrey et al. |
| 6,549,768 | B1 | 4/2003 | Fraccaroli |
| 6,571,279 | B1 | 5/2003 | Herz et al. |
| 6,618,593 | B1 | 9/2003 | Drutman et al. |
| 6,651,086 | B1 | 11/2003 | Manber et al. |

(Continued)

FOREIGN PATENT DOCUMENTS

GB 2397400 A 7/2004

*Primary Examiner* — George C Neurauter, Jr.
(74) *Attorney, Agent, or Firm* — Fitch Even Tabin & Flannery

(57) ABSTRACT

A business or social networking method described herein enables mobile device users to meet one another, on a permission basis. Whether a given pair of mobile device users are introduced depends on whether a server determines they are in intellectual or "cognitive" proximity, which is typically a function of one or more factors. Individuals who match to a given degree or threshold are said to be in intellectual proximity. When given mobile devices users are within physical proximity of one another during an overlapping time window, the server determines whether the users are also within a given intellectual proximity. If so, and if both users have opted to receive new introductions, the server issues a mutual collaboration opportunity message to the users to determine whether they desire an introduction. If the mobile device users agree to be introduced, the server establishes a direct private messaging session between them.

32 Claims, 5 Drawing Sheets

U.S. PATENT DOCUMENTS

| | | |
|---|---|---|
| 6,819,919 B1 | 11/2004 | Tanaka |
| 6,862,610 B2 | 3/2005 | Shuster |
| 6,944,443 B2 | 9/2005 | Bates et al. |
| 6,968,179 B1 | 11/2005 | De Vries |
| 7,035,618 B2 | 4/2006 | Schnurr |
| 7,071,842 B1 | 7/2006 | Brady, Jr. |
| 7,209,931 B2 | 4/2007 | Thambidurai et al. |
| 7,310,676 B2 | 12/2007 | Bourne |
| 7,424,541 B2 | 9/2008 | Bourne |
| 2001/0046657 A1 | 11/2001 | Dorn |
| 2003/0120817 A1 | 6/2003 | Ott et al. |
| 2004/0198386 A1 | 10/2004 | Dupray |
| 2004/0235493 A1 | 11/2004 | Ekerborn |

FIG. 2B

METHOD AND COMPUTER SYSTEM FOR MATCHING MOBILE DEVICE USERS FOR BUSINESS AND SOCIAL NETWORKING

This application is a continuation of Ser. No. 11/198,126, filed Aug. 6, 2005, which application was a continuation-in-part of Ser. No. 10/906,194, filed Feb. 8, 2005, which application was based Ser. No. 60/543,105, filed Feb. 9, 2004, and Ser. No. 60/582,313, filed Jun. 23, 2004.

BACKGROUND

Online and mobile social networking applications are known in the art. These applications are typically operated as managed services by application service providers (ASPs) and share several common characteristics. In particular, users typically create unique personal profiles that include basic information including identity, interests, profession, history, testimonials and information about their network. Users map their relationship with other members, either inviting other members to join their network (e.g., Friendster and LinkedIn), or by using software to scan existing relationships recorded in computer contact software (e.g., Spoke and Visible Path). Typically, connections are facilitated by sending messages (instant messages or emails) to friends who are already known or directly to people that are not known by the user. Other connections can be made through linking chains of existing relationships of people who may or may not be known to the user.

There are also mobile social networking applications known in the art. Most commonly, these applications provide such functions as friend-finding, text-dating and community message aggregation. Friend-finder applications (e.g., Dodgeball) announce connections in a user's "relationship map," which can identify the location of the user or the friend. Such applications may also consult the relationship map and identify "friends of friends" who have announced they are within a certain range of the user's vicinity. Text-dating applications (e.g., MobiVibe) allow users to connect with new friends who meet age and gender criteria, enabling users to communicate, e.g., to exchange text messages. Community message aggregators (e.g., Upoc) distribute messages from one member to all members within a specific community. In an illustrative service, one member identifies a famous person or celebrity and a message about the person or celebrity is communicated to all community members.

Further, it is also known in the prior art to use online business people search engines to mine public sources of data, for instance the Internet's World Wide Web (WWW), for professional history information and contact details. The recruitment industry (e.g., Eliyon) typically uses such business professional databases to find candidates for job positions.

While these applications provide advantages, there remains a need in the art to provide more efficient techniques for enabling mobile device users to identify, locate and contact (e.g., be introduced to) like-minded people. The present invention addresses this need.

BRIEF SUMMARY

A business or social networking method is operative in a server. The method enables mobile device users to meet one another, on a permission basis. The determination of whether a given pair of mobile device users are introduced depends on whether the server determines they are in intellectual (or "cognitive") proximity, which is typically a function of one or more factors, such as: each user's reciprocal networking objective, the nature of the industry in which the user works, the user's level within the management hierarchy of his or her company, any specialty function the individual may possess, and so on. Individuals who are matched in one or more of such attributes to a given degree or threshold are said to be in intellectual proximity. According to the invention, when given mobile devices users are within physical proximity of one another during an overlapping time window, the server determines whether the users are also within a given intellectual proximity. If so, and if both users have opted to receive new introductions, the server issues a mutual collaboration opportunity message to each of the mobile device users to determine whether they desire to be introduced to one another. Preferably, the mutual collaboration opportunity message masks personally identifying information. If the mobile device users agree to be introduced, the server establishes a communication (e.g., a direct private messaging session) between them.

The subject matter herein may be implemented as a computer system that facilitates business and/or social networking activities by and among mobile device users. In one embodiment, mobile device users use a Web browser (on a computer, or the device itself) to register online for a managed business networking service that is provided by a system operator, who administers the system and manages introductions between registered mobile device users. In particular, the system operator runs at least one server that programmatically identifies and introduces mobile device users that are in intellectual proximity as reflected by profile data supplied by the respective mobile device users during the registration process. The server interfaces to a telecommunications network through a gateway, such as a message gateway. As noted above, whether a given pair of registered mobile device users are in intellectual proximity to one another typically depends on several factors, such as the individual's personal profile (e.g., industry, peer level, job function or specialty, gender, on-line published endorsements, endorsements from other members, strength of relationship with other users, qualitative evaluation of employer and job title), the relationship of the individual's profile to the profile of the other user, and the individual's networking objectives (e.g., employment search, looking to meet industry peers, looking for suppliers, or the like). When a registered mobile user informs the system that he or she is available for business networking (which may occur as a result of the online registration process or dynamically, e.g., through a direct request to access the service), the server determines whether to make an introduction by evaluating whether a pair of mobile device users are in intellectual proximity during an overlapping time window. This evaluation may also take into consideration the relative locations of the mobile device users, which may be determined by the server directly or through an interface to a location service provider (LSP). In one embodiment, the server determines whether a pair of mobile users should be introduced by evaluating a given function that trades off a degree of intellectual proximity and distance. Thus, a given intellectual proximity condition or threshold might be relaxed or strengthened if prospective mobile users are close to one another (e.g., at the same trade show); in the alternative, a given distance condition or threshold might be relaxed or strengthened depending on the type of intellectual proximity being evaluated. Registered mobile device users who have been determined to be in intellectual proximity during an overlapping time window are then each sent a message from the server. The message queries whether the respective mobile device user desires to meet (or be introduced to) another mobile device user who has been found to be appropriately matched, preferably based on the intellectual proximity determination and, optionally, distance and time availability. An intellectual proximity determination may be approximate. This mutual collaboration opportunity message preferably masks personally identifying information. In an alternative embodiment, paired users exchange messages directly, without the need for mutual confirmation). If the matched users agree to be introduced, preferably a direct private messaging session is facilitated through the server. Preferably, all such messaging takes place over SMS or other suitable messaging service. In an alternative embodiment, a mobile device user initiates a contact by performing a networking search query that identifies one or more prospects, who can then be contacted by the mobile device user asynchronously.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIGS. 2A-2C illustrates a set of new member registration displays through which an end user creates a user profile for the service;

FIG. 3 illustrates a pair of mobile device users activating the service; and

DETAILED DESCRIPTION

The subject matter herein enables mobile device users to engage in business and social networking. The terms "business" and "social" in this context should not be taken to limit the present invention. Mobile device users may have varied objectives and these terms are provided merely for illustrative purposes. Moreover, as used herein, a "mobile device user" should be broadly construed. It includes any wireless client device, e.g., a cellphone, pager, a personal digital assistant (PDA, e.g., with GPRS NIC), a mobile computer with a smartphone client, or the like. A typical mobile device is a wireless access protocol (WAP)-enabled device that is capable of sending and receiving data in a wireless manner using the wireless application protocol. The wireless application protocol ("WAP") allows users to access information via wireless devices, such as mobile phones, pagers, two-way radios, communicators, and the like. WAP supports wireless networks, including CDPD, CDMA, GSM, PDC, PHS, TDMA, FLEX, ReFLEX, iDEN, TETRA, DECT, DataTAC, and Mobitex, and it operates with many handheld device operating systems, such as PalmOS, EPOC, Windows CE, FLEXOS, OS/9, and JavaOS. Typically, WAP-enabled devices use graphical displays and can access the Internet (or other communication network) on so-called mini- or micro-browsers, which are web browsers with small file sizes that can accommodate the reduced memory constraints of handheld devices and the low-bandwidth constraints of a wireless networks. In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. In an illustrated embodiment, mobile device users use SMS, which is a text message service that enables short messages (e.g., generally no more than 140-160 characters in length) to be sent and transmitted from a mobile device.

The present invention is not limited to mobile device users who have WAP-enabled devices or to use of any particular type of wireless network. Such devices and networks are merely illustrative; any wireless data communication technology now known or hereafter developed may be used in connection with the invention that is now described in more detail.

Figure 1:
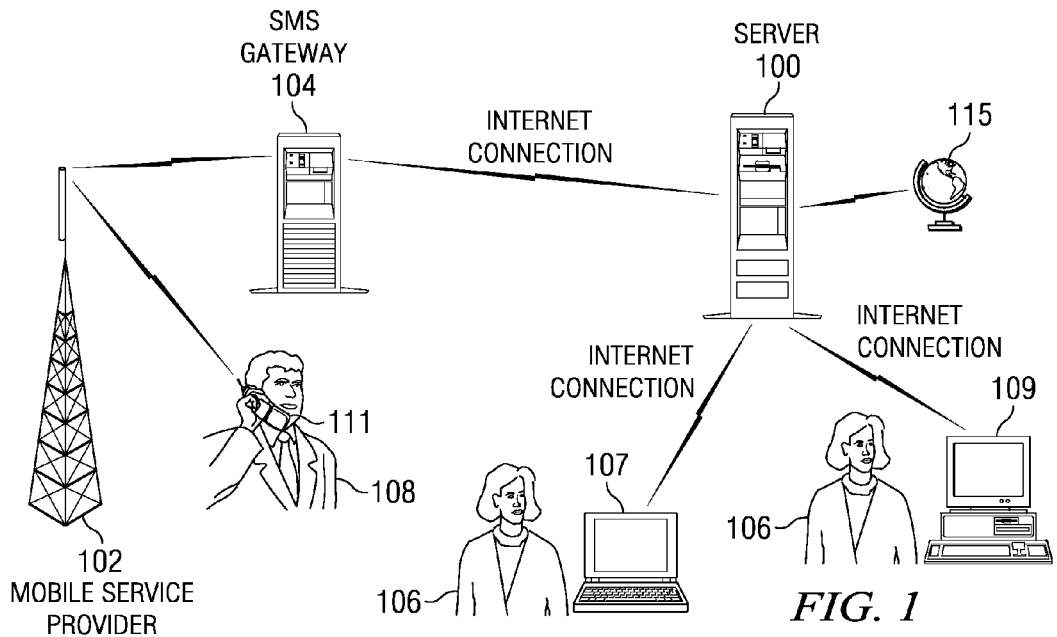
FIG. 1 illustrates how mobile device users register to use the business networking service of the present invention.

As illustrated in FIG. 1, the present invention may be implemented as a managed service (e.g., in an ASP model) using a server 100, which is connected or connectable to one or more networks. For illustrated purposes, the server 100 is illustrated as a single machine, but one of ordinary skill will appreciate that this is not a limitation of the invention. More generally, the service is provided by an operator using a set of one or more computing-related entities (systems, machines, processes, programs, libraries, functions, or the like) that together facilitate or provide the inventive functionality described below. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, ASP) and a set of applications or processes (e.g., Java applets or servlets, linkable libraries, native code, or the like, depending on platform), that provide the functionality of a given system or subsystem. The service may be implemented in a standalone server, or across a distributed set of machines. Typically, a server connects to the publicly-routable Internet, a corporate intranet, a private network, or any combination thereof, depending on the desired implementation environment. As illustrated FIG. 1, the server 100 is also in communication with a mobile service provider (MSP) 102 through a gateway, such as SMS gateway 104.

As also illustrated in FIG. 1, one or more users 106 register for the service, typically by using a client machine, such as a laptop 107 or desktop computer 109. In such case, registration is initiated by an end user opening a Web browser to the operator's Web site registration page (or set of registration pages). Another user 108 is illustrated as registering using his or her mobile device 111, e.g., through a mini-browser or other similar interface. These techniques are merely representative, as any convenient technique (including, without limitation, email, filling out and mailing forms, and the like) may be used. Thus, in the illustrated embodiment, users register with the server 100 (or set of servers) either through Internet connections from personal computers, or via remote registration through a mobile device.

Figure 2A:
Figure 2B:
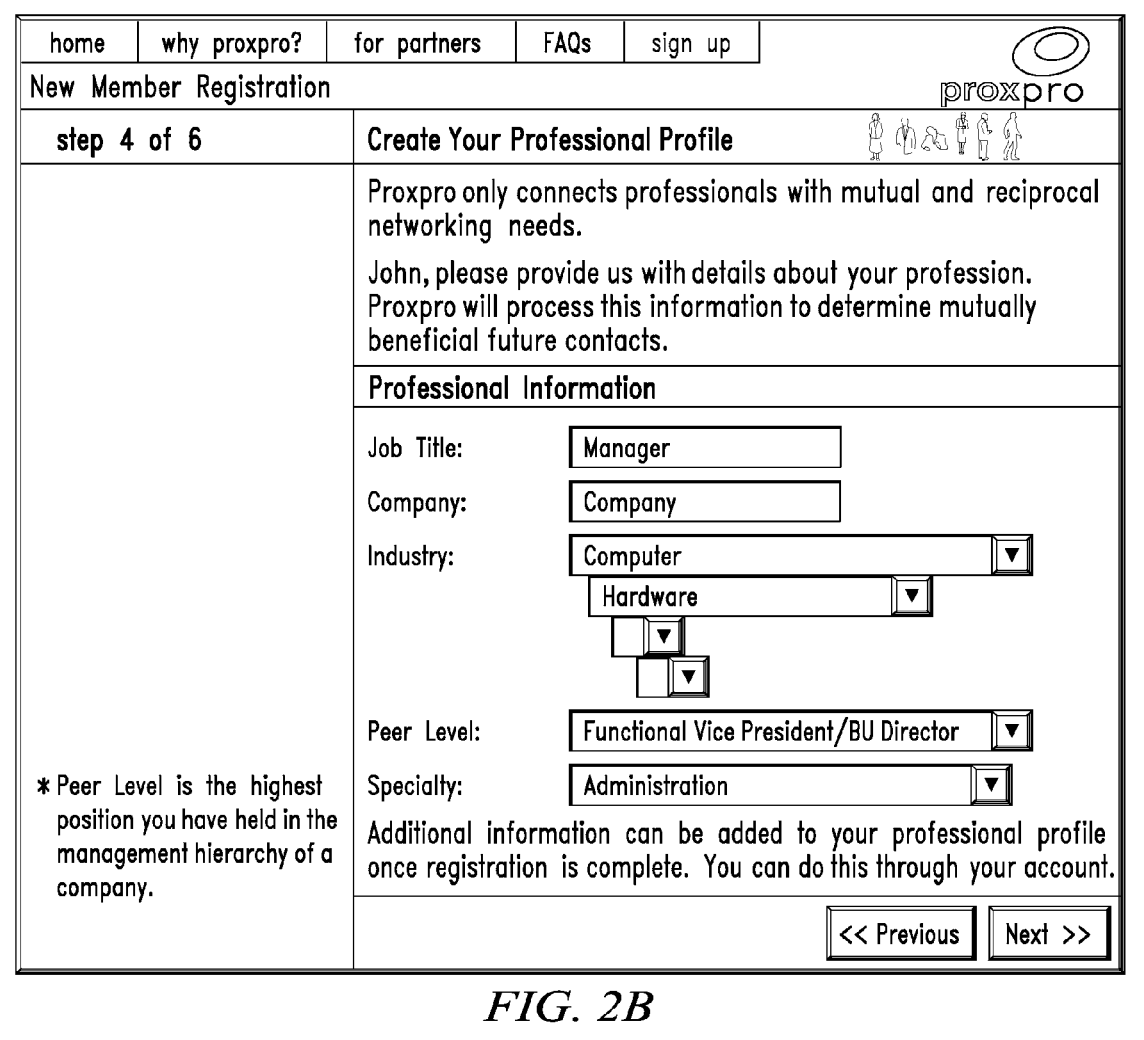
Figures 2C, 3:
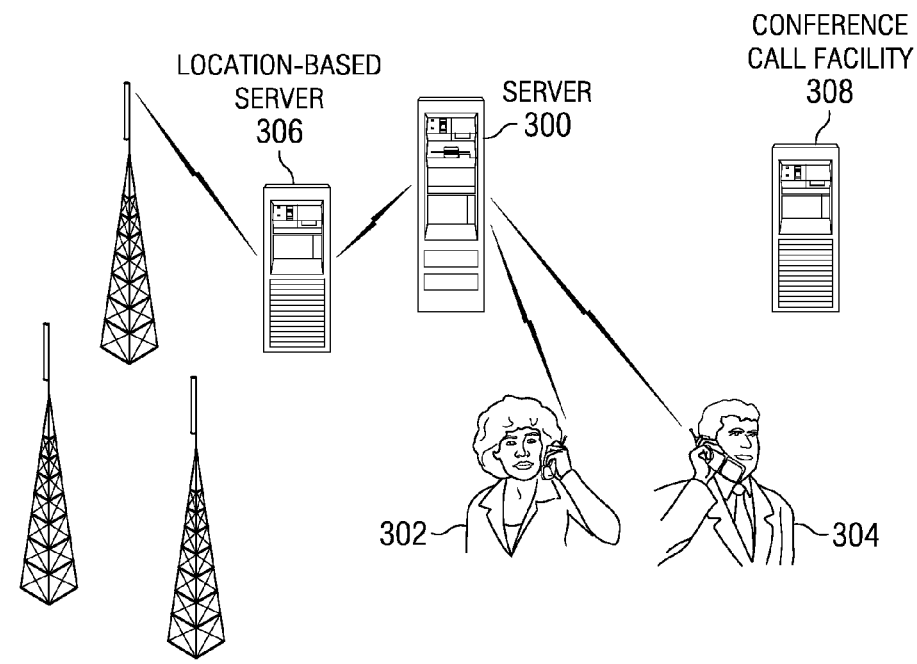

FIGS. 2A through 2C illustrate a set of representative displays for the registration process. Any convenient GUI may be used, and these displays may be combined. The member establishes an account for the service using the display panel shown in FIG. 2A. Account information typically includes name, gender, age, email address, wireless telephone carrier, mobile telephone number and zip code. The user's professional profile is established using the display panel illustrated in FIG. 2B. By this display, the member enters his or her job title, company name, industry, peer level and specialty. Once again, these are merely representative data fields. Dropdown menus provide additional levels of detail as required. In FIG. 2C, the member can identify one or more networking objectives, such as: meeting an industry peer, a prospective business partner, a future employer, a future employee, and so forth. Of course, the identified categories are merely representative. The display may provide a text field in which the member can input an additional category. A set of dropdown lists may provide additional options. The member selects and/or enters one or more of the identified options and to complete the process. Some or all of the data entered in the display panels of FIGS. 2A-2C comprises the user's profile data that will be then used by the business and social networking routines to evaluate whether the user is in "intellectual proximity" to another user.

Preferably, and as will be described below, once the member has completed his or her registration, the server performs an online "background" check, preferably via the World Wide Web (WWW) or other available database or data repository, to determine whether the member is who he or she purports to be. This basic operation is illustrated in FIG. 1 with the server 100 accessing various Web resources 115 to confirm the profile data entered by the member.

Figure 4:
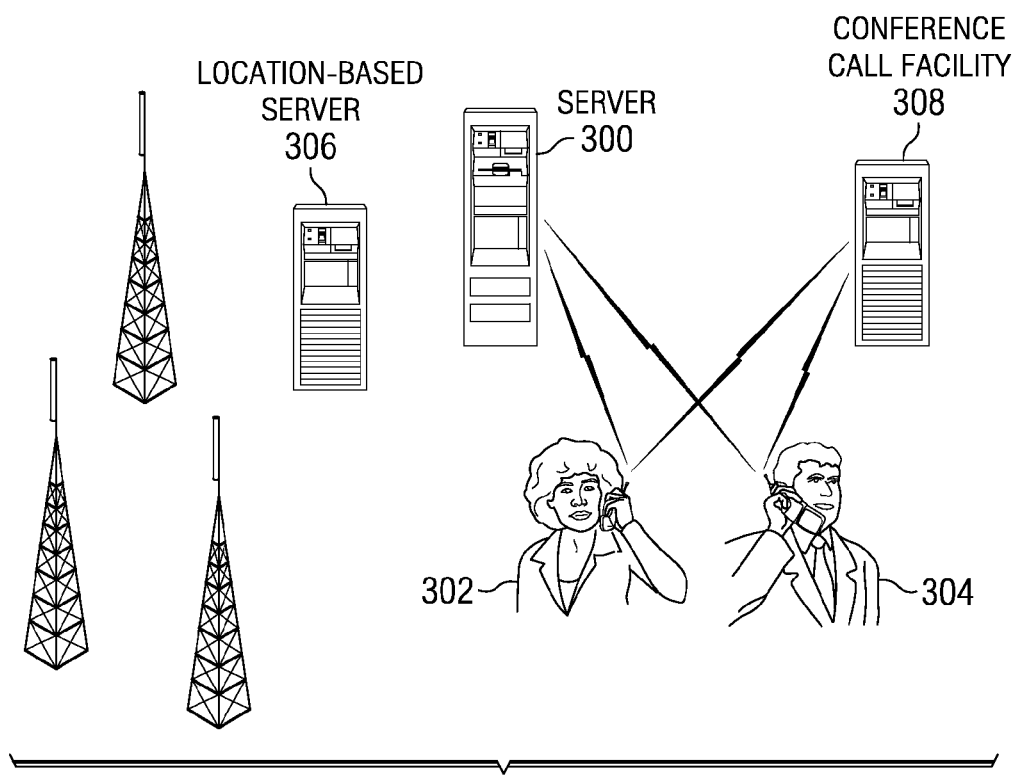
FIG. 4 illustrates how the service establishes a communication between a pair of mobile device users who have agreed to be introduced.

The present invention facilitates business or social networking among the mobile device users who register for the service. The basic operation is shown in FIGS. 3 and 4. In particular, the method enables mobile device users to meet one another, preferably on a permission basis. Preferably, the determination of whether given mobile device users are introduced (one to one, or one to many) depends on whether the server determines that they are in "intellectual" (or "cognitive") proximity, which is typically a function of one or more factors, such as: each user's reciprocal networking objective, the nature of the industry in which the user works, the user's level within the management hierarchy of his or her company, any specialty function the individual may possess, and so on. Individuals who are matched in one or more of such attributes to a given degree or threshold are said to be in intellectual proximity. As illustrated in FIG. 3, when given mobile devices users 302 and 304 are within physical proximity of one another during an overlapping time window, the server 300 determines whether the users are also within a given intellectual proximity. In FIG. 3, the mobile device users have been determined to be in the same location through the use of a location service provider (LSP) 306. In particular, upon receipt of a message activating the service, preferably the server accesses the LSP 306 to determine the mobile device user's location. The server then determines whether the mobile device users are within a degree of intellectual proximity. If the server 300 determines that the users 302 and 304 are within an acceptable degree of intellectual proximity, and if both users have opted to receive new introductions, the server 300 issues to each of the mobile device users a given message, which is referred to herein as a "mutual collaboration opportunity" message. The mutual collaboration opportunity" message is sent by the server to determine whether the mobile device users desire to be introduced to one another. A mobile device user may accept the invitation, decline the invitation, or take some other action. Preferably, the mutual collaboration opportunity message masks personally identifying information. This preserves user anonymity, other than given professional data from the user's profile. If the mobile device users agree to be introduced, the server establishes a communication (e.g., a direct private messaging session) between them.

This process is illustrated in FIG. 4. In particular, the server 300 sends messages (such as by SMS) to each of the users 302 and 304, and that message preferably includes a premium conference call number and PIN code to activate the conference call facility 308. The mobile device users can maintain their privacy but then use the conference call to determine whether they wish to meet or exchange direct phone numbers.

Thus, according to the present invention, a mobile device user registers for the service and is then selectively matched with persons that the server determines might be of interest to the mobile user, typically based on the user's professional data and the reciprocal networking objectives of the user and other such users. During the registration process, the user is prompted to fill database fields providing professional details including, without limitation, job description, employer, industry, management level, specialty function, and the like. The user also outlines the profile of people the user would like to meet through the service, including target contact profiles. As has been illustrated, the user's networking objective is entered or otherwise determined. The matching of networking objectives, together with industry, management stratum and other information, provides a quantitative prediction of the value of two users being introduced, which avoids zero sum interactions.

In an alternative embodiment, the mobile end user need not perform a formal registration. Rather, a mobile end user registers by sending a simple message (e.g., via SMS) including, for example, his or her first name, last name and company name. The server provisionally registers the new user and then performs a search of the Web or other accessible data repository or database, to obtain the end user's professional profile data. This embodiment enables mobile device users to access and use the service on an "as-needed" basis. The server parses the received message (which typically includes the mobile device user's phone number), provisionally registers the new user, and then inserts the received information into search fields of an automated search engine. The search engine identifies listings on the WWW (or some other database or pre-populated database) that meet the inputs. Further, preferably the server searches the retrieved listings for keywords, e.g., indicating job title, industry and specialty job function, within "n" characters of the user's name. This enables the search engine to mine the available data for useful information about the user and his professional background, as well as information that may be useful in determining the user's potential networking objectives. Preferably, the search algorithms also navigate the URLs returned to attempt to find additional information about the user. Such information may be quite varied and may indicate his or her status, social capital, human capital, or other interests.

As a user's name often is not unique, an identity verification text message may be sent from the server to the provisionally-registered new user. The user receives the verification text message and optionally selects the information corresponding to his or her name or other identifier. The server discards information for the non-selected options and retains provisional registration information based on the selection. If desired, the user in due course is able to update his or her profile more precisely, e.g., using the online registration previously described.

Thus, according to this alternative embodiment of the invention, the service is able to match Industry stratum and function of two unregistered uses in real-time, on-demand, as if the remote registered member had registered online.

The server has a database, and the computer programs or processes therein preferably operate as a state machine, receiving user activations, searching for mobile device user matches, and facilitating introductions. Preferably, the server interacts with mobile device users using a messaging service, such as SMS. Any convenient messaging service, however, may be used. The basic operation of the server is now described in more detail.

Although any convenient technique may be used, users preferably activate the service in the manner that is now described. As used herein, a user "activates" the service to attempt to obtain an introduction to another mobile device user, typically one that is a given location within an overlapping time window. Typically, mobile device users are potentially introduced only if they are within a given physical proximity within overlapping time windows, i.e., at a given time when such introductions are possible. A given mobile device user activates the service preferably by sending a message from his or her mobile device. Typically, the message is sent to the server's pre-assigned short code, e.g. a five digit mobile device code associated with the business networking service. Preferably, the text message is delivered to an SMS gateway by a mobile carrier; the gateway, in turn, relays the message to the server. The message body of the text message includes commands that then are parsed by the server. The message body may include an activation command and a duration after which the activation will elapse. If automated location data is not available, the message may include location-related data, such as a zip code, a landmark, an airport code, or other identifier, from which location can be derived. If commands in the message body text do not include specific information on time active and location, assumptions may be made according to other information preferably recorded at the time of registration. Thus, for example, the program may default to the user's home location (e.g., a registration location) and assume that the user is active for "n" minutes.

The server receives a text message and recognizes the device's unique mobile number, from which the identity of the user is determined (based on the registration). The server has a database and programs or processes therein operate as a state machine, receiving user activations, searching for matches, and facilitating introductions. The program queries its database and flags data referring to the user's professional profile. In particular, program retrieves from the database information specifying who the user is as well as the user's target contact profiles (i.e., one or more profiles of the types of people the user would like to meet). Throughout the process, status flags of users in the database are systematically altered and updated, e.g., to depict the user's current status, as well as a match session status in relation to other active users. When an activation message is received, the user's status in the database is changed from inactive to active.

On receiving each user's activation command, preferably data is recorded registering the time of activation and the location and the duration of activation. Location data may be determined automatically, e.g., by referencing a location service (e.g., a GSM location service provider) that provides the mobile device user's current location such as latitude and longitude. Alternatively, as noted above, this data may be provided by some other geographic location reference point, such as: zip code, landmark, airport or conference hall identity. It may be provided by an RFID reference, a GPS reference, or any other convenient mechanism or locating service.

The server identifies active participants. In particular, the server matches the personal profile of a given first user against the target contact profile of a second user, and vice versa. In an illustrative embodiment, the match is considered mutual and reciprocal if the personal profile of the second user matches the target contact profile of the first user and the personal profile of the first user matches the target contact profile of the second user. Preferably, program scripts executing in the server calculate a relative quantitative and qualitative value of potential interactions according to how closely users match. This provides a degree to which a match is mutual and reciprocal. According to the invention, the determination of whether users are matched may be influenced by other factors, such as the user's relative distance from one another. In this approach, the server determines whether a pair of mobile users should be introduced by evaluating a given function that trades off a degree of intellectual proximity and distance. Thus, a given intellectual proximity condition or threshold might be relaxed or strengthened if prospective mobile users are close to one another (e.g., at the same trade show); in the alternative, a given distance condition or threshold might be relaxed or strengthened depending on the type of intellectual proximity being evaluated. As noted above, registered mobile device users who have been determined to be in intellectual proximity during an overlapping time window are then each sent a message from the server. The message queries whether the respective mobile device user desires to meet (or be introduced to) another mobile device user who has been found to be appropriately matched, preferably based on the intellectual proximity determination and, optionally, distance and time availability.

According to a useful variant of the service, activated users may also be alerted to the physical proximity of one or more of another user's contacts (e.g., co-workers, friends, or the like). In this embodiment, quantitative and qualitative measures may be used to determine the strength of the relationship and the order in which users are introduced. Thus, if the server is analyzing whether first and second mobile device users are in intellectual proximity, it may also determine whether the first mobile device user is in intellectual proximity to a third mobile device user who is also a contact of the second mobile device user. In this example, it is assumed that the server has (or can obtain) access to the second mobile device user's "contact" list. If the server determines that the first and third users are within intellectual proximity, it may issue a mutual collaboration opportunity message to each the first and third mobile device users to determine whether these users desire to be introduced to one another.

The particular matching algorithm that may be used may be quite varied. In a representative embodiment, the server (typically, one or more computer programs or processes executing on a processor) simply calculates and ranks the relative value for all combinations and permutations of introductions for all "active" users in the database. Potential introductions are then ranked according to overlap of time window availability, distance between users, and intellectual proximity. Preferably, the server regularly recalculates and re-ranks activated users, as more users become active or as users deactivate (e.g., through active time lapse or through switching the service off).

If a mutual and reciprocal introduction, or an introduction that reaches a pre-determined quality threshold, is available, a "match session" is created between two users. The status flag for each user is then changed from "activated unmatched" to "activated match proposed." For each session, the time of the proposed match is then recorded. When activated users are included in a session, preferably their profiles are no longer available to be matched against other users in an "activated unmatched users" pool. When the match session is created between user 1 and user 2, a message is sent from the service short code (via the message gateway) alerting user 2 that user 1 is activated and available. Another message is sent to user 1 saying user 2 is activated and available. This was illustrated in FIG. 4. Preferably, a summary of the personal profile of the prospective match is included in the message. In addition, preferably the message also includes other information, such as the distance between each user, the window of overlapping time, and the like. This information allows both users to determine if they would like to communicate directly with one another. Preferably, users are prompted to reply to the short code indicating in their message whether they would like to communicate directly with one another.

If a user replies confirming that he or she would like to communicate with the match directly, that user's status in the database is updated from "match proposed" to "match accepted." If both users mutually reply that the match is accepted, then the status flags change to "match active." During a match session where the status is "match active," the service notifies each user that they are now active within the match session. Any messages sent back to the server are then relayed to the other user in the match session. In this manner, messages that protect user privacy are routed through the server to the other user without exposing private identification information, e.g., mobile telephone number and last name. In addition, preferably the server avoids the use of "identity handles" to create the service functionality. Preferably, messages enable users within a session to further determine if they would like to give more specific information, such as information that might allow them to meet or communicate more directly. At anytime, each user is able to break off the session, request a new match, or switch off the service. If a new match is requested, the match session is closed, the status is changed to "active unmatched" and the users are returned to the pool of "active unmatched users." If a specific period of time elapses without messages between users in a session, they are notified and their status is returned to "activated unmatched." Records of active sessions may be maintained to ensure that users who have had matches proposed are not re-introduced.

In a preferred embodiment, a matching algorithm determines a quality of match between two candidates as a function of several factors, namely: time availability, reciprocal networking intent, physical proximity, relative management stratum, industry, and specialty function. Time availability is a temporal proximity, and this factor may be used except where a given user wishes to be alerted of a match even when not activated. Reciprocal networking intent compares each candidate's networking objective and attempts to find a match based on that objective and the networking objective of a candidate match, e.g., user 1 is an employer looking for an employee and user 2 is an employee looking for an employer. Physical proximity refers to the distance between two activated users whose location can be determined, e.g., through a LSP or otherwise. Management stratum refers to the relative level within the management hierarchy of each user. A weighting may be applied to the management stratum value depending on the size of the company. The industry component is determined from a comprehensive list of industries that are categorized into high level generic industries, preferably with submenus that subdivide into more specific categories. The specialty function is the actual job function within an organization.

Preferably, the matching algorithm further categorizes reciprocal networking intent as "specific" or "non-specific." When a user's networking intent objective is specific, then the matching algorithm requires a more precise correlation between the user's networking objective and one or more of the other factors that comprise intellectual proximity. In contrast, when a user's networking intent is non-specific, the matching algorithm may relax or accept a less precise correlation between networking intent and the other factors. In addition, where specific and non-specific networking intent can be identified, the algorithm typically weights one or more of the other factors as being of "high," "medium" and "low" importance. This weighting is illustrated below by several examples.

Thus, when an employer is looking for an employee, or vice versa, the reciprocal networking intent is specific and the algorithm weights the additional factors as follows: physical proximity (high), stratum (high), specialty (high) and industry (medium). When a customer is looking for a supplier, or vice versa, the reciprocal intent is once again specific, but the algorithm may weight only the industry and physical proximity as having high importance, with the other factors being of low importance. An example of non-specific networking intent would be where an individual simply desires to meet a peer in his or her industry. In this example, the algorithm weights the factors as follows: physical proximity (high), management stratum (high), and industry (medium) and the other factors of low importance. Another example is where a user is looking for a potential business partner, in such case physical proximity, management stratum and industry are weighted with high importance and the other factors are weighted as being of low importance. These are merely representative examples. One of ordinary skill will appreciate that the type of factors and their appropriate weights may be quite varied, depending on the application.

The algorithm continuously executes against a pool of unmatched, activated users. For each user within the pool, the algorithm ranks that user against other potential users, calculating a quality of match value using the factors and their weights as described above. If the quality of match value exceeds a given threshold, then the two users are removed from the pool of unmatched, activated users and placed into a match session, during which they are offered the opportunity to be introduced as has been described. If desired, the given threshold itself may be varied, e.g., by changing the importance of one or more of the quality of match factors. As a further variation, the algorithm may alter the influence of one or more factors the longer the period of time that a user remains unmatched. More generally, the server may selectively or dynamically alter match session criteria to facilitate instances where mutual and reciprocal match sessions are not otherwise possible. By altering match session criteria in this manner, instances where mutual and reciprocal match sessions that lead to satisfactory interactions can still be made despite a relative less close "fit" in a pair's intellectual proximity.

In some circumstances, when an ideal candidate becomes available, other members (whether activated or inactivate) can be automatically alerted of their availability. Additionally, if an ideal candidate activates within a location adjacent to another member's registered location, special alerts can be sent.

As described above and illustrated in FIG. 4, users may create conference call sessions. Thus, for example, once both individuals have confirmed their wish to teleconference, a message with a premium conference call number is sent to each user's mobile phone together with a PIN code identifying a specific virtual conference room. Each user connects to the conference call premium call number and is welcomed in a virtual conference call room. Preferably, the identification of the other party is then announced and the facility continues until one party chooses to leave the conference call. In some circumstances, where parties are registered, the conference call center may call each user to avoid wrong number mistakes. Additionally, it may be desirable to provide a method to verify that the parties are who they say they are. While this conference call approach is preferred (as it provides a direct private messaging session), the communication can also be undertaken in any convenient alternative manner. Thus, for example, the server may simply arrange to send information (e.g., by email, by fax, by SMS in-box, or the like) to enable the matched users to communicate in another wireless, wired, or other manner.

As noted above, preferably the server uses robot search algorithms to verify the status and stratum of members who register for the service. These search algorithms automatically review available published materials on members, e.g., on the World Wide Web or other searchable databases. They then verify the identified information against the profiles. Individuals are categorized to ensure that only homophile individuals of the same or substantially similar management level are able to be introduced.

The present invention is not limited to a one-to-one introduction between mobile device users.

The present invention provides numerous advantages over the prior art. In particular, one advantage over existing Internet-based social networking applications is that a mobile device user is able to meet (preferably face-to-face) a specific high value contact they he or she seeks, all through the convenience of his or her mobile phone. A representative mobile device user is a business professional who travels frequently, a tradeshow attendee, or the like, typically a person who does not have ready access to a computer or even the Internet but still desire to meet high yield contacts wherever he or she may be during a given time window of opportunity.

An advantage of the inventive system over existing mobile social networking applications is that the system preferably calculates (automatically) networking symmetry based on a given function of intellectual proximity, time and location. Preferably, as noted above, the system also verifies user identity by automatically reviewing published materials on the World Wide Web (or in any other accessible databases or repositories). In addition, preferably the system also categorizes users according to other characteristics or attributes such as contact quality. These methods are used to predict successful non-zero sum (win-win) networking introductions.

The present invention provides high performance, scalable networking functionality even where there is no infrastructure readily available. For example, the invention may be used by any organization whose members have an Internet connection (if needed, for registration) and a mobile device. Any organization or entity (commercial, charitable, social, religious, or otherwise) can benefit from the service. Such organizations include, without limitation, alumni organizations, conference providers, search and recruitment providers, and many others. The platform may be readily adapted to facilitate introductions for dating, recruitment, alumni, special interest, web blog publishers, and religious application, among many others. In a given implementation, the present invention provides on-line and wireless professional networking infrastructure to tradeshow organizers to safely connect attendees to one another at a given event.

One or more functions described above may be implemented in a client-side application that is downloadable to and executable on a mobile user's mobile device. The application may also be installed by the manufacturer or provider. Such an application enhances the richness and content of the networking information service, while preserving privacy and location features. It also enables additional functionality, such as asynchronous messaging, as well as real-time, multimedia messaging. In addition, according to another embodiment of the present invention, the end user mobile device includes an application that facilitates keyword searching of Internet published information, as will be described in more detail below.

A mobile device application may be a thin client application, based on Java (J2ME) or Brew, that is downloaded on (or that is otherwise installed as original equipment in) the end user's mobile device. An end user of the information service also may obtain the application in response to receiving an invitation, such as an advertisement, a text message, or the like.

Figure 5A:
FIGS. 5A-5E illustrate various display screens generated by a client-side end user device application according to another embodiment of the present invention.
Figure 5B:
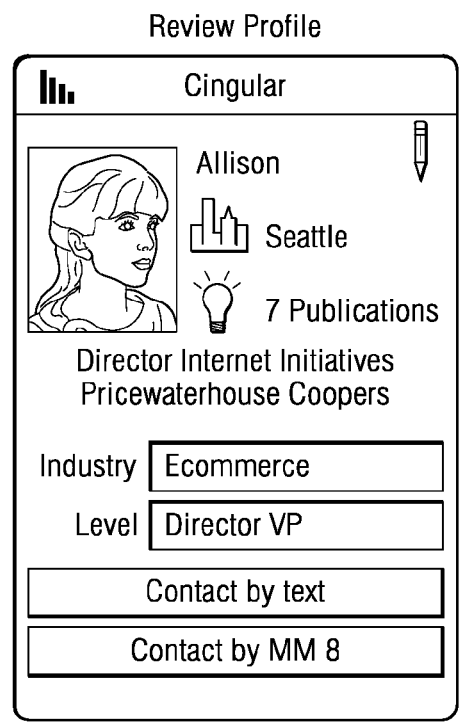
Figures 5C, 5D:
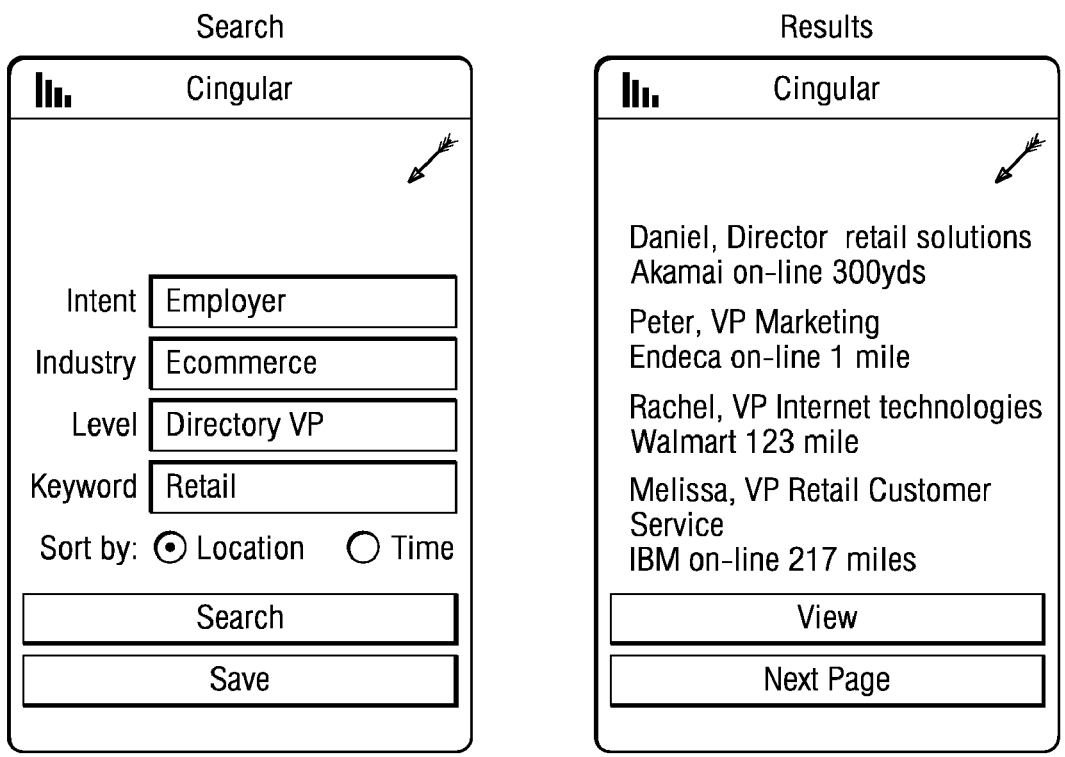

As illustrated in FIG. 5A, the application comprises a home (index) page that is similar to on-line user interfaces and includes one or more tabs to a message inbox, profile, address book, target contacts, and a search function. When the user selects the "profile" tab, the profile page in FIG. 5B is opened. This page includes one or more fields in which given information is displayable. These include, for example, first name, home city, on-line publications and references, job title, present employer, previous employers, and general category terms including industry and management level. When the user selects the "search" tab from the index page, a search page such as shown in FIG. 5C is opened. This page exposes a search engine input form that includes one or more fields, such as: networking intent, industry, management level and keyword. These fields may change as a function of networking intent, which may be selectable from a set of entries in a dropdown list. The keyword reference preferably searches on-line or through given database publications for responsive information. The page may also include control buttons or the like to enable the requesting user to sort the search results by intellectual proximity, location, time, time since last use, or the like. Although not illustrated, the search results page may also include a designation of how long a particular prospect has been on-line or off-line.

In particular, according to an illustrative embodiment, upon entry of given information in the search page (in FIG. 5C), a database of users (e.g., registered users, subscribers, or even prospects) may be searched according to one or more of: intellectual proximity, physical proximity, and temporal proximity. In this embodiment, the server receives a search query from a requesting end user that has entered a search request into his or her device (e.g., through the search input form shown in FIG. 5C). In this variant, temporal proximity preferably refers to a time since a user last made a query of the networking server. When the search is activated, the server database is queried and a set of one or more potential introductions are extracted based on the search criteria. The resulting data is formatted and returned to the requesting end user. At the end user's mobile device, the search results are formatted and displayed, such as illustrated in FIG. 5D. Preferably, the search results are presented in order of sort preference giving name, job title and company (or other identifying affinity), the distance between the user the networking prospect, and the time since that prospect last queried the database.

Figure 5E:
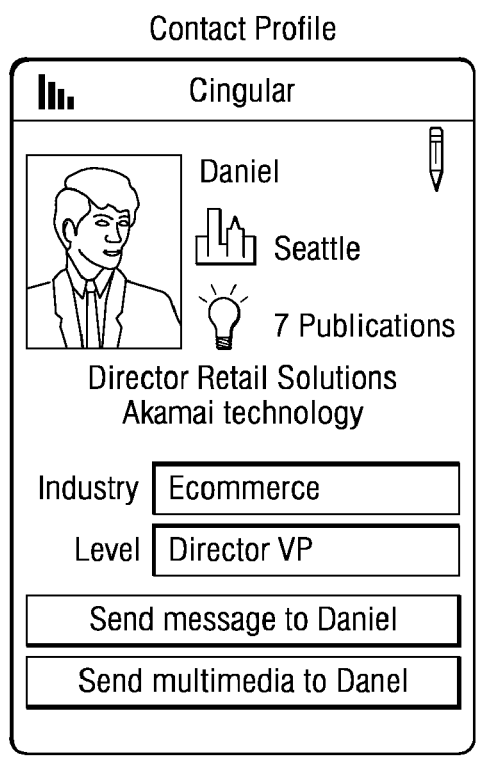

Once the search results are obtained, the end user may then take a given action (e.g., activate a link or initiate another request) to the information service to reveal a profile (or a given portion thereof) of a given potential contact. One such profile is illustrated in FIG. 5E, which is delivered from the networking server to the requesting end user's mobile device when the requesting user highlights a given profile and selects a View link (in FIG. 5D). In a preferred embodiment, the profile, however, does not reveal (i.e. masks) personally identifiable information. In a representative embodiment, the profile (as illustrated in FIG. 5E) includes given identifying information, such as the prospect's first name, current job title, industry, current employer, physical location and status with respect to the networking service (e.g., "on-line 200 yards"), and the like. After reviewing this list of profile(s), the end user (who initiated the search in the first instance) may then send a message (SMS, MMS, e-mail, or the like) to the chosen contact, e.g., via the networking server, which then delivers (or has delivered) the message in the manner previously described. In one embodiment, the message (requesting a meeting) can be delivered directly to the prospect's device (e.g., via SMS, MMS, or the like) or, in the alternative, asynchronously to the prospect's in-box. In the latter case, the potential prospect can then view the invitation at his or her convenience. The message may be of any convenient form, e.g., it may include a URL to a map identifying a suggested meeting location, or open a page with the map itself.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, as noted above, the invention also relates to apparatus for performing the operations herein. This apparatus may be specially constructed for the required purposes, or it may comprise a general-purpose computer (or multiple computers) selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given systems, machines, devices, processes, instructions, program sequences, code portions, and the like.

What is claimed is:

1. A method comprising:
   receiving registration information at a server from computing devices to create individual profiles;
   determining, based on the individual profiles, whether a first profile associated with a first mobile device in communication with the server is within intellectual proximity to a second profile associated with a second mobile device in communication with the server, wherein intellectual proximity is determined at least in part by relative management stratum of the first profile and second profile, wherein management stratum is afforded a first weight in response to the first profile and the second profile including a specific business networking intent objective, and a second weight, less than the first weight, in response to the first profile and the second profile including a non-specific business networking intent objective;
   in response to the first profile and the second profile being in intellectual proximity, issuing a mutual collaboration opportunity message to the first mobile device and the second mobile device.

2. The method of claim 1 further comprising in response to receiving messages from the first mobile device and the second mobile device indicating agreement for introduction, establishing a direct private messaging session between the first mobile device and the second mobile device.

3. The method of claim 1 wherein the issuing the mutual collaboration opportunity message further comprises sending information regarding proximity of the first mobile device to the second mobile device.

4. The method of claim 1 further comprising:
   receiving at the server information regarding location of individual mobile devices associated with the individual profiles including the first mobile device and the second mobile device;
   wherein the determining comprises determining whether the first mobile device and the second mobile device and the first profile and the second profile are within a combined intellectual proximity, temporal proximity, and physical proximity;
   and wherein the issuing the mutual collaboration opportunity comprises issuing the mutual collaboration opportunity in response to determining that the first mobile device and the second mobile device and the first profile and the second profile are within the combined intellectual proximity, temporal proximity, and physical proximity.

5. The method of claim 4 wherein the receiving the information regarding location comprises at least one of receiving the information from a location server and receiving the information from the individual mobile devices.

6. The method of claim 1 wherein the issuing the mutual collaboration opportunity message comprising masking personally identifying information from the mutual collaboration opportunity message.

7. The method of claim 1 further comprising searching by the server for additional information regarding an individual profile.

8. The method claim 7 further comprising sending from the server a message confirming an identification of the additional information relating to a given individual profile to a mobile device associated with the given individual profile.

9. The method of claim 1 further comprising receiving at the server from a mobile device associated with a given individual profile a command to activate the given individual profile for matching.

10. A method comprising:
    receiving at a server information regarding location of individual mobile devices associated with individual profiles associated with the server, the individual mobile devices including a first mobile device and a second mobile device;
    determining whether the first mobile device associated with a first profile of the individual profiles and the second mobile device associated with a second profile of the individual provides and the first profile and the second profile are within a combined intellectual proximity, temporal proximity, and physical proximity;
    issuing a collaboration opportunity message to at least one of the first mobile device and the second mobile device in response to determining that the first mobile device and the second mobile device and the first profile and the second profile are within the combined intellectual proximity, temporal proximity, and physical proximity; and wherein the intellectual proximity comprises determining, based on the individual profiles, whether the first profile is within intellectual proximity to the second profile, wherein intellectual proximity is determined at least in part by a business networking intent objective of at least one of the first profile and the second profile being specific or non-specific.

11. The method of claim 10 further comprising in response to receiving messages from the first mobile device and the second mobile device indicating agreement for introduction, establishing a direct private messaging session between the first mobile device and the second mobile device.

12. The method of claim 10 wherein the issuing the collaboration opportunity message further comprises sending information regarding proximity of the first mobile device to the second mobile device.

13. The method of claim 10 wherein the issuing the collaboration opportunity message comprising masking personally identifying information from the collaboration opportunity message.

14. The method of claim 10 further comprising searching by the server for additional information regarding an individual profile.

15. The method claim 14 further comprising sending from the server a message confirming an identification of the additional information relating to a given individual profile to a mobile device associated with the given individual profile.

16. The method of claim 10 further comprising receiving at the server from a mobile device associated with a given individual profile a command to activate the given individual profile for matching.

17. A method comprising:
receiving at a server a search query from a first mobile device;
based on the search query, identifying one or more prospects from a set of individual profiles based on the one or more prospects having, with respect to the first mobile device and a first profile associated with the first mobile device, a given intellectual proximity, temporal proximity, and physical proximity in combination with a given match of the search query;
sending to the first mobile device information identifying the one or more prospects;
in response to receiving a message from the first mobile device regarding at least one of the one or more prospects, enabling communication between the first mobile device and a second mobile device associated with the at least one of the one or more prospects;
wherein determining the intellectual proximity comprises determining, based on the individual profiles, whether the first profile is within intellectual proximity to a given individual profile, wherein intellectual proximity is determined at least in part by a business networking intent objective of at least one of the first profile and the given individual profile being specific or non-specific.

18. The method of claim 17 wherein identifying a given intellectual proximity, temporal proximity, and physical proximity in combination with a given match of the search query comprises weighing individual factors based on information received in connection with the first profile.

19. The method of claim 17 further comprising in response to receiving messages from the first mobile device and the second mobile device indicating agreement for introduction, establishing a direct private messaging session between the first mobile device and the second mobile device.

20. The method of claim 17 wherein the enabling communication further comprises sending information regarding proximity of the first mobile device to the second mobile device.

21. The method of claim 17 wherein the sending to the first mobile device information identifying the one or more prospects comprising masking personally identifying information regarding the one or more prospects.

22. The method of claim 17 further comprising searching by the server for additional information regarding an individual profile.

23. The method claim 21 further comprising sending from the server a message confirming an identification of the additional information relating to a given individual profile to a mobile device associated with the given individual profile.

24. The method of claim 17 further comprising receiving at the server from a mobile device associated with a given individual profile a command to activate the given individual profile for matching.

25. A non-transitory computer readable medium storing instructions that in response to execution by a computing device cause the computing device to perform operations comprising:
receiving registration information to create individual profiles;
determining, based on the individual profiles, whether a first profile associated with a first mobile device in communication with the computing device is within intellectual proximity to a second profile associated with a second mobile device in communication with the computing device, wherein intellectual proximity is determined at least in part by relative management stratum of the first profile and second profile, wherein management stratum is afforded a first weight in response to the first profile and the second profile including a specific business networking intent objective, and a second weight, less than the first weight, in response to the first profile and the second profile including a non-specific business networking intent objective;
in response to the first profile and the second profile being in intellectual proximity, issuing a mutual collaboration opportunity message to the first mobile device and the second mobile device.

26. The non-transitory computer readable medium of claim 25 wherein the instructions further comprise instructions to cause the computing device to perform operations comprising in response to receiving messages from the first mobile device and the second mobile device indicating agreement for introduction, establishing a direct private messaging session between the first mobile device and the second mobile device.

27. The non-transitory computer readable medium of claim 25 wherein the instructions further comprise instructions to cause the computing device to perform operations comprising:
receiving information regarding location of individual mobile devices associated with the individual profiles including the first mobile device and the second mobile device;
wherein the determining comprises determining whether the first mobile device and the second mobile device and the first profile and the second profile are within a combined intellectual proximity, temporal proximity, and physical proximity;
and wherein the issuing the mutual collaboration opportunity comprises issuing the mutual collaboration opportunity in response to determining that the first mobile device and the second mobile device and the first profile and the second profile are within the combined intellectual proximity, temporal proximity, and physical proximity.

28. A non-transitory computer readable medium storing instructions that in response to execution by a computing device cause the computing device to perform operations comprising:

receiving at a server information regarding location of individual mobile devices associated with individual profiles associated with the computing device, the individual mobile devices including a first mobile device and a second mobile device;

determining whether the first mobile device associated with a first profile of the individual profiles and the second mobile device associated with a second profile of the individual provides and the first profile and the second profile are within a combined intellectual proximity, temporal proximity, and physical proximity;

issuing a collaboration opportunity message to at least one of the first mobile device and the second mobile device in response to determining that the first mobile device and the second mobile device and the first profile and the second profile are within the combined intellectual proximity, temporal proximity, and physical proximity; and wherein the intellectual proximity comprises determining, based on the individual profiles, whether the first profile is within intellectual proximity to the second profile, wherein intellectual proximity is determined at least in part by a business networking intent objective of at least one of the first profile and the second profile being specific or non-specific.

29. The non-transitory computer readable medium of claim 28 wherein the instructions further comprise instructions to cause the computing device to perform operations comprising further comprising in response to receiving messages from the first mobile device and the second mobile device indicating agreement for introduction, establishing a direct private messaging session between the first mobile device and the second mobile device.

30. A non-computer readable medium storing instructions that in response to execution by a computing device cause the computing device to perform operations comprising:

receiving at a server a search query from a first mobile device;

based on the search query, identifying one or more prospects from a set of individual profiles based on the one or more prospects having, with respect to the first mobile device and a first profile associated with the first mobile device, a given intellectual proximity, temporal proximity, and physical proximity in combination with a given match of the search query;

sending to the first mobile device information identifying the one or more prospects;

in response to receiving a message from the first mobile device regarding at least one of the one or more prospects, enabling communication between the first mobile device and a second mobile device associated with the at least one of the one or more prospects;

wherein determining the intellectual proximity comprises determining, based on the individual profiles, whether the first profile is within intellectual proximity to a given individual profile, wherein intellectual proximity is determined at least in part by a business networking intent objective of at least one of the first profile and the given individual profile being specific or non-specific.

31. The non-transitory computer readable medium of claim 30 wherein identifying a given intellectual proximity, temporal proximity, and physical proximity in combination with a given match of the search query comprises weighing individual factors based on information received in connection with the first profile.

32. The non-transitory computer readable medium of claim 30 wherein the instructions further comprise instructions to cause the computing device to perform operations comprising in response to receiving messages from the first mobile device and the second mobile device indicating agreement for introduction, establishing a direct private messaging session between the first mobile device and the second mobile device.

* * * * *

UNITED STATES PATENT AND TRADEMARK OFFICE
CERTIFICATE OF CORRECTION

| | | |
|---|---|---|
| PATENT NO. | : 7,970,912 B2 | Page 1 of 1 |
| APPLICATION NO. | : 12/205990 | |
| DATED | : June 28, 2011 | |
| INVENTOR(S) | : Bourne | |

It is certified that error appears in the above-identified patent and that said Letters Patent is hereby corrected as shown below:

Column 1, line 4, below Title insert -- CROSS-REFERENCE TO RELATED APPLICATIONS --.

Column 14, line 42, in Claim 8, delete "method" and insert -- method of --.

Column 15, line 25, in Claim 15, delete "method" and insert -- method of --.

Column 16, line 12, in Claim 23, delete "method" and insert -- method of --.

Column 18, line 1, in Claim 30, delete "non-computer" and insert -- non-transitory computer --.

Signed and Sealed this
First Day of November, 2011

David J. Kappos
*Director of the United States Patent and Trademark Office*